(12) United States Patent
Treurniet et al.

(10) Patent No.: US 8,058,784 B2
(45) Date of Patent: Nov. 15, 2011

(54) INTEGRATED REFLECTOR LAMP

(75) Inventors: Theodoor Cornelis Treurniet, Eindhoven (NL); Wouter Petrus Kaandorp, Eindhoven (NL); Annemarie Paulien Buddemeijer-Lock, Eindhoven (NL); Theodorus Maria Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 913 days.

(21) Appl. No.: 11/572,585

(22) PCT Filed: Jul. 18, 2005

(86) PCT No.: PCT/IB2005/052385
§ 371 (c)(1),
(2), (4) Date: Jan. 24, 2007

(87) PCT Pub. No.: WO2006/013493
PCT Pub. Date: Feb. 9, 2006

(65) Prior Publication Data
US 2007/0194680 A1  Aug. 23, 2007

(30) Foreign Application Priority Data
Jul. 27, 2004  (EP) .................................... 04103587

(51) Int. Cl.
*H01J 61/34* (2006.01)
*H01J 5/16* (2006.01)

(52) U.S. Cl. ......................................... 313/113; 313/25

(58) Field of Classification Search .................. 313/113, 313/25; 315/56
See application file for complete search history.

(56) References Cited

U.S. PATENT DOCUMENTS

| 3,684,908 | A | * | 8/1972 | Beese .............................. 313/24 |
| 4,490,649 | A |   | 12/1984 | Wang |
| 4,623,815 | A | * | 11/1986 | Krieg et al. ................... 313/113 |
| 4,964,829 | A | * | 10/1990 | Westlund et al. ............... 445/22 |
| 5,412,275 | A | * | 5/1995 | Dorsemagen et al. ... 313/318.01 |
| 5,541,477 | A | * | 7/1996 | Maya et al. .................... 313/493 |
| 5,569,981 | A |   | 10/1996 | Cho ................................. 315/56 |
| 5,597,232 | A | * | 1/1997 | Ohashi et al. ................. 362/265 |
| 5,691,598 | A |   | 11/1997 | Belle et al. |
| 5,864,461 | A | * | 1/1999 | Cho ................................. 361/674 |
| 5,986,405 | A | * | 11/1999 | De Maagt et al. ............. 313/637 |
| 6,111,359 | A |   | 8/2000 | Work et al. |
| 6,204,602 | B1 | * | 3/2001 | Yang et al. ....................... 315/58 |

(Continued)

FOREIGN PATENT DOCUMENTS

EP  0430560 A2  6/1991
(Continued)

OTHER PUBLICATIONS

WO2004/077490.*

Primary Examiner — Karabi Guharay

(57) ABSTRACT

An integrated reflector lamp (1) comprising an outer wall (3,9,13) enclosing a light source (6), a metal reflector (7), and an electronic power supply unit (4) to which the light source (6) is connected, wherein the reflector (7) extends between the light source (6) and the electronic power supply unit (4). Said outer wall (3,9,13) comprises a substantially conical portion (3) and a transparent portion (9) that covers the opening of said conical portion (3). The reflector (7) also covers the opening of said conical portion (3). The reflector (7) and the transparent portion (9) enclose the light source (6), the reflector (7) and the conical portion (3) enclose the electronic power supply unit (4).

14 Claims, 2 Drawing Sheets

U.S. PATENT DOCUMENTS

Figure 1:
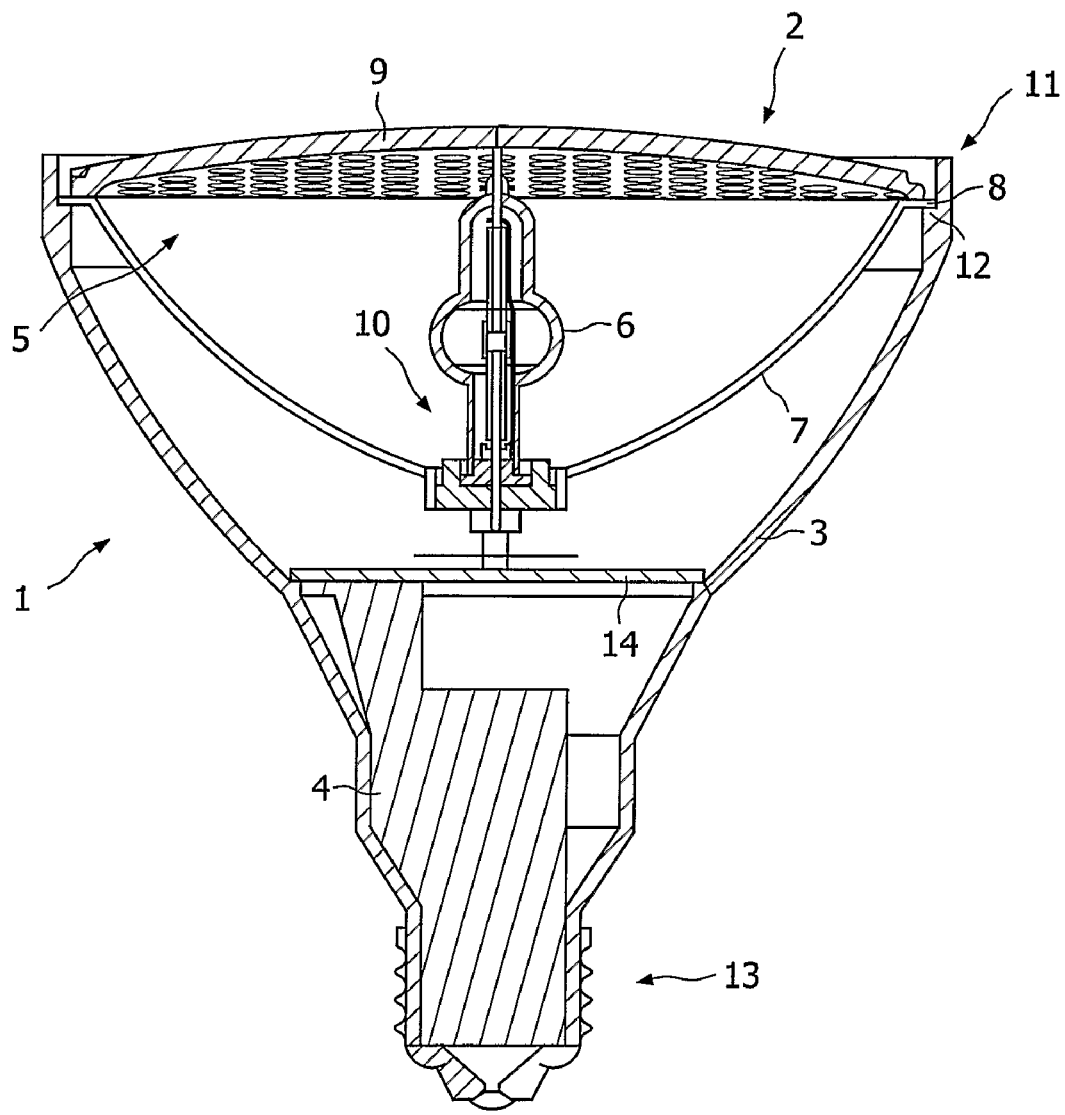

| | | |
|---|---|---|
| 6,604,845 B2 | 8/2003 | Golz |
| 7,258,464 B2 * | 8/2007 | Morris et al. .................. 362/264 |
| 2002/0171364 A1 | 11/2002 | Golz et al. |
| 2003/0090902 A1 | 5/2003 | Kavanagh |
| 2006/0232178 A1 * | 10/2006 | Setzer et al. .................. 313/113 |

FOREIGN PATENT DOCUMENTS

| | | |
|---|---|---|
| EP | 0430560 B1 | 6/1991 |
| GB | 494192 | 10/1938 |
| WO | 9742651 A2 | 11/1997 |

\* cited by examiner

INTEGRATED REFLECTOR LAMP

The invention relates to an integrated reflector lamp comprising an outer wall enclosing a light source, a reflector, and an electronic power supply unit to which the light source is connected, wherein the reflector extends between the light source and the electronic power supply unit.

In a preferred embodiment, said outer wall comprises a substantially conical portion and a transparent portion that covers the opening of said conical portion. The reflector preferably also covers the opening of said conical portion. In the preferred embodiment, the reflector and the transparent portion enclose the light source, and the reflector and the conical portion enclose the electronic power supply unit.

Such a lamp is described in WO 97/42651 (U.S. Pat. No. 6,111,359). The known CDM 20 W HID integrated reflector lamp, make Philips, comprises an outer wall or shell enclosing a sealed reflector unit and a power supply unit. The reflector unit has a glass envelope sealed in a gastight manner and enclosing a light source with a high-pressure discharge vessel. The glass envelope includes a pressed glass reflector with a reflective coating thereon, and a pressed glass lens. Plastic reflectors are used in alternative embodiments. The coating on the reflector is, for example, an aluminum, silver, or multi-layer dichroic coating.

The temperature of the power supply unit electronics is a concern in the integrated lamp. Since both the electronics of the power supply unit and the discharge vessel are in the same sealed housing, the discharge vessel easily heats up the electronics by radiation and convection during operation. A higher temperature of the electronics will shorten lamp life because the electronics will fail sooner. This problem becomes worse when a more compact lamp with better optical characteristics is to be designed, wherein the discharge vessel has to be mounted closer to the power supply unit, and wherein, for example, the light source extends coaxially relative to the reflector and the surface of a base wall portion of the light source is in contact with the reflector.

It is therefore an object of the invention to enable a more compact integrated reflector lamp and/or to achieve an increased lifetime of an integrated reflector lamp and/or to provide an integrated reflector lamp that is easier to produce.

According to the invention, the reflector is a metal reflector. A reflector that is substantially entirely made of a metal has the effect that part of the heat of the light source is transferred to the outer wall of the lamp through conduction by the reflector, since metal has a higher thermal conductivity than other applicable materials like glass or plastic. A smaller portion of the heat will thus be transferred to the power supply unit owing to radiation and convection. Experiments have shown that a decrease in the temperature of the power supply unit electronics of between 10° C. and 15° C. is achieved in a compact 20 W integrated lamp in comparison with a plastic reflector. Some examples of suitable metals are steel, aluminum, and copper, which may have a coating thereon to improve the reflective characteristics of the reflector.

To reduce the temperature of the power supply unit during lamp operation further, the invention also relates to an integrated reflector lamp, wherein a heat shield extends substantially transversely between the reflector and the electronic power supply unit. Said heat shield is preferably a Printed Circuit Board (PCB) on which electronic parts of the power supply may be mounted that can resist higher temperatures. Said heat shield preferably divides the lamp into two compartments in a substantially airtight manner.

The invention is also applicable to halogen incandescent light sources with an integrated electronic power supply, such as the PAR-e lamp, make Philips. The word ballast should also be interpreted as comprising such an electronic power supply in the present context.

Figure 2:
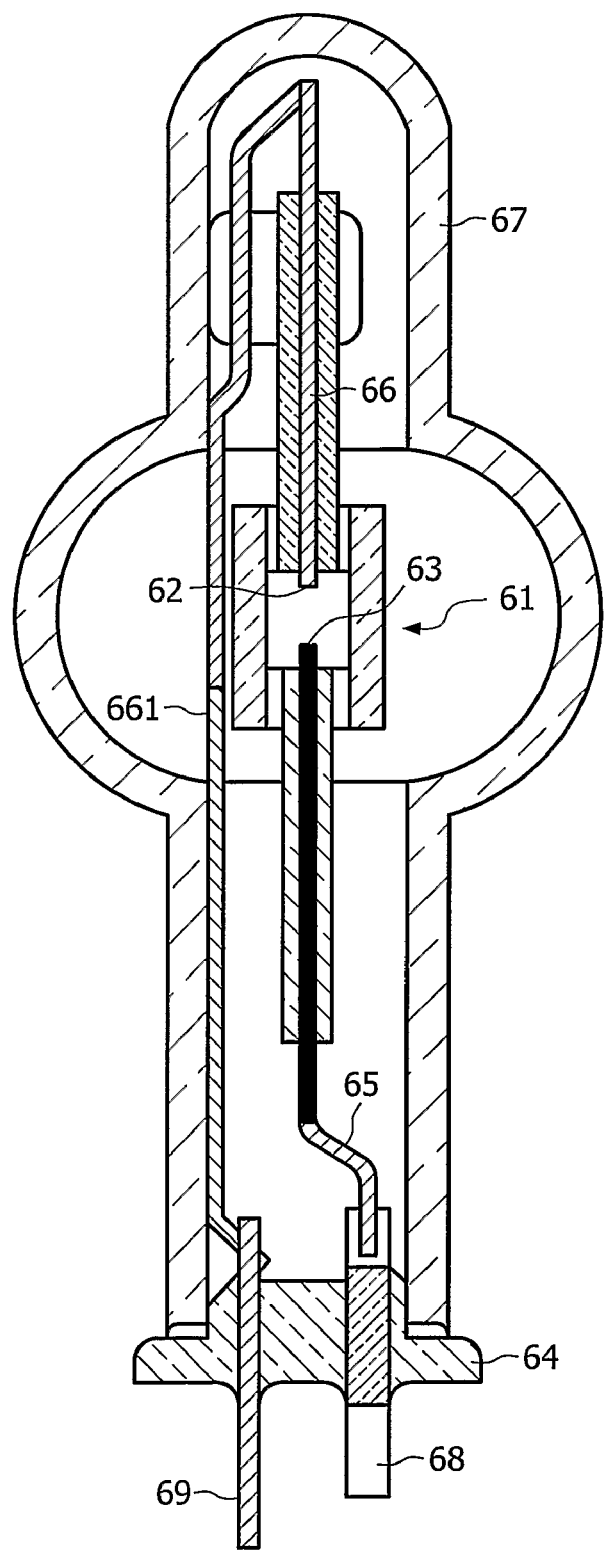

The invention will now be explained in more detail with reference to an embodiment and the drawings, in which:

FIG. 1 is a partial schematic cross-sectional view of a HID integrated reflector lamp; and FIG. 2 shows a cross-section of a high-pressure discharge light source as shown in FIG. 1.

The Figures are diagrammatic and not drawn true to scale. Some dimensions are particularly strongly exaggerated for reasons of clarity. Equivalent components have been given the same reference numerals as much as possible in the Figures.

FIG. 1 shows a HID integrated reflector lamp 1 having a sealed reflector unit 2 received in a conical portion formed by a substantially conical shell 3 that encloses a power supply unit 4. The power supply unit 4 is shown schematically only and comprises a PCB and various electronic components. The PCB of power supply unit 4 is mounted perpendicularly on a second PCB, which acts as a heat shield 14 and which further reduces the temperature of the power supply unit during operation of a light source 6. The heat shield 14 extends between a base of the light source 6 and a reflector 7 on one side and the power supply unit on the other side in order to prevent heat transfer from the light source base 64 to the power supply unit 4 by radiation, while substantially the entire circumference of the heat shield 14 engages the wall of the shell 3 so that also convection of hot air between the two compartments thus formed is prevented. Parts of the power supply unit 4 that are not thermally critical may be directly mounted on the heat shield 14. The reflector unit 2 comprises a reflector light source envelope 5 sealed in a gastight manner and enclosing a high-pressure discharge light source 6, which will be described in more detail with reference to FIG. 2.

The light source envelope 5 includes a metal reflector 7 having a parabolic reflective surface which extends up to a rim 8 of the reflector body. A cover in the form of a pressed glass lens 9 is sealed to the reflector body at the rim 8. The parabolic surface has an optical axis with a focus on said optical axis. The light source 6 is arranged axially on the optical axis. The base portion of the reflector comprises a recessed portion 10, wherein the light source base 64 (see FIG. 2) is received. The bottom of the recessed portion 10 comprises holes through which contact members 68, 69 extend.

The shell 3 is molded from a synthetic resin material which withstands the operating temperatures reached by the sealed reflector unit 2 and the power supply unit 4. Suitable materials include PBT, polycarbonate, polyetherimide, polysulphine, and polyphenylsulphine. The shell 3 has a rim portion 11 which retains the outer surface of the rim 8 of the sealed reflector unit 2. A circumferential shoulder 12 provides a seat for the rim 8 of the reflector body. The sealed reflector unit 2 is secured by means of ultrasonic welding against the shoulder 12. Opposite the rim portion 11, the shell has a base portion which is provided with a standard lamp screw base 13. The screw base 13 has a connection to the input leads from the power supply unit 4.

FIG. 2 diagrammatically shows a cross-section of the high-pressure discharge light source 6. The high-pressure discharge light source 6 comprises a ceramic discharge vessel 61. The discharge vessel 61 encloses, in a gastight manner, a discharge space provided with an ionizable filling comprising mercury, a metal halide, and a rare gas. Electrodes 62, 63 are arranged in the discharge space. The high-pressure discharge light source 6 is further provided with a light source base 64 made from an electrically insulating material. The light source base 64 supports the discharge vessel 61 via the first and second current supply conductors 65, 66. The light source base 64 also supports the outer bulb 67. The light source base 64 is provided with a first contact member 68 formed by an exhaust tube to which the current conductor 65 is fastened. In addition, the light source base 64 is provided with a second contact member 69 connected to the second supply conductor 66 via a connection conductor 661 running alongside the discharge vessel 61. The contact members 68, 69 are electrically connected to the power supply unit 4.

The outer bulb 67 is connected to the light source base 64 in a gastight manner. A suitable control of the atmosphere in the outer bulb 67 protects the current supply conductors 65, 66 satisfactorily against oxidation. Since oxidation of the current supply conductors 65, 66 is prevented, the current supply conductors 65,66 can be positioned relatively close to the discharge vessel 61. A control of the atmosphere in the outer bulb renders it possible to avoid press seals and/or tipped-off (quartz) tabulations, resulting in a simplified and compact high-pressure discharge light source 6. The outer bulb 67 can be evacuated via the exhaust tube 68 after the discharge vessel 61 and the outer bulb 67 have been mounted on the light source base 64 of the high-pressure discharge light source 6. After evacuation and, if so, desired, the provision of the desired atmosphere inside the outer bulb 67, the exhaust tube 68 is sealed off. A getter is preferably used inside the outer bulb 67, for example a water/hydrogen/oxygen mix to absorb impurities. The exhaust tube 68 in the light source base 64 is made from a metal or from a NiFeCr alloy.

The light source base 64 is made from quartz glass, hard glass, soft glass, glass-ceramic, or a ceramic material. In addition, the light source base 64 is provided as a sintered body, preferably a sintered ceramic body. The light source base 64 is plate-shaped. The light source base 64 can be manufactured with a high dimensional accuracy. The light source base 64 has the additional advantage that it can be made in a light color, for example white or a pale grey. The use of a material with a light color causes light emitted by the discharge vessel 61 to be reflected into usable beam angles, thereby increasing the efficiency of the luminaire or the total efficiency of the high-pressure discharge lamp. It is prevented thereby that the light incident on the light source base 64 is lost to the light beam, which may be formed by means of the reflector. The light source base 64 has a planar surface facing away from the discharge vessel 61. This surface is mounted against the bottom of the recessed portion 10 of the reflector 7, and accordingly is a suitable surface for serving as a reference for the position of the discharge vessel 61. The surface of the light source base 64 facing the discharge vessel has a central elevation which serves to center the discharge vessel 61 and enamel ring with respect to the light source base 64 during the manufacture of the high-pressure discharge light source 6.

The outer bulb 67 is made from quartz glass, hard glass, or soft glass. The outer bulb 67 is fastened to the light source base 64 by means of an enamel of (glass) frit. The enamel is provided in the form of a pre-shaped ring. The use of such a pre-shaped ring considerably improves the accuracy of the positioning of the discharge vessel 67 during the manufacture of the high-pressure discharge lamp. The choice of the enamel depends on the material of the outer bulb 67 and on the material of the light source base 64. The height of the high-pressure discharge light source 6 is equal to or less than 40 mm or 50 mm.

The scope of the invention is not limited to the above embodiment. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. An integrated reflector lamp comprising
   an outer wall enclosing a light source having a discharge vessel, a base and an outer envelope around the discharge vessel;
   a reflector comprising a body, wherein the body is entirely made of a metal to transfer heat generated by the light source to the outer wall; and
   an electronic power supply unit connected to the light source, wherein the reflector extends between the light source and the electronic power supply unit, and wherein the base has an elevation that extends into the outer envelope for centering the discharge vessel, and wherein a portion of the elevation surrounded by the outer envelope contacts the outer envelope.

2. The integrated reflector lamp according to claim 1, wherein said outer wall comprises a substantially conical portion and a transparent portion that covers the opening of said conical portion, and wherein the reflector covers the opening of said conical portion.

3. The integrated reflector lamp according to claim 2, wherein the light source extends coaxially relative to the reflector.

4. The integrated reflector lamp according to claim 2, wherein the reflector and the transparent portion enclose the light source hermetically.

5. The integrated reflector lamp according to claim 2, wherein the reflector and the conical portion enclose the electronic power supply unit.

6. The integrated reflector lamp according to claim 1, further comprising a heat shield extending substantially transversely between the reflector and the electronic power supply unit.

7. The integrated reflector lamp according to claim 6, wherein said heat shield is a PCB.

8. The integrated reflector lamp according to claim 6, wherein said heat shield divides the lamp into two compartments in a substantially airtight manner.

9. The integrated reflector lamp according to claim 1, wherein said light source is a high-pressure discharge light source.

10. The integrated reflector lamp according to claim 1, wherein said light source is a halogen light source.

11. The integrated reflector lamp of claim 1, wherein the reflector comprises a base having a recess for receiving the light source.

12. The integrated reflector lamp of claim 1, wherein the light source further comprises an enamel ring surrounding the elevation.

13. The integrated reflector lamp of claim 1, wherein the reflector further comprises a reflective coating to improve reflective characteristics of the reflector.

14. The integrated reflector lamp of claim 1, wherein the metal includes at least one of steel, aluminum and copper.

* * * * *